UNITED STATES PATENT OFFICE.

CHARLES BERG, OF BROOKLYN, NEW YORK.

PAINT AND METHOD OF MAKING THE SAME.

1,396,986.  Specification of Letters Patent.  Patented Nov. 15, 1921.

No Drawing.  Application filed June 22, 1920. Serial No. 390,828.

*To all whom it may concern:*

Be it known that I, CHARLES BERG, a citizen of the United States, and a resident of New York city, borough of Brooklyn, Kings county, State of New York, have invented an Improvement in Paints and Methods of Making the Same, of which the following is a specification.

My invention relates to paints and methods of producing the same, and aims to provide a paint which is not only economical and convenient to manufacture, but also possesses superior covering and protecting qualities especially in connection with articles which it is desired to protect from weathering and corrosion, especially by contact with sea water and similar corroding agents.

By way of example, I shall in the accompanying specification describe in detail illustrative embodiments of the product and process of my invention, it, however, being understood that my invention is not limited to such illustrative embodiments herein set forth for purposes of illustration only.

In manufacturing one form of the pigment of my invention, I may proceed as follows: I first take a silicate, preferably mica, this material being largely an orthosilicate of aluminum and potassium. I finely subdivide this material, preferably to a fineness of at least 300 mesh, or even finer. The fine mica powder is now dampened with a suitable carrier, such as ordinary turpentine. I now add to the dampened mica powder ordinary white lead, or equivalent pigment in the proportion of one part of dampened mica powder to one part of the white lead, or its equivalent. These two materials are now thoroughly mixed so that a substantially uniform mixture is obtained.

The heavy paint thus made may now be thinned down to the proper consistency with an equal amount of mixture of equal parts of boiled linseed oil and copal varnish. I prefer that the copal varnish shall be strictly pure and shall consist of pure copal gum mixed to the proper consistency with pure turpentine and pure linseed oil. The various ingredients of the final paint or pigment are now thoroughly mixed until a uniform mixture of the proper consistency and uniformity is obtained.

The resulting product comprises paint of superior wearing qualities which may readily be applied by means of a brush in the usual manner, or by dipping the object to be covered into the paint. The pigment of my invention will, I have discovered, readily stand the quick process of hard drying in ovens heated by steam, or otherwise, and known to those skilled in the art as "baking." In color the pigment, where no other coloring agent or pigment has been added, appears to be a shiny, grayish white. Where desired, any suitable color may be given to the pigment of my invention by adding thereto standard or other colors to any desired shade.

I find that the pigment of my invention is not only economical and comparatively cheap and simple to manufacture, but that its life as compared with many other pigments is very much longer and its weathering qualities much superior. In particular, its protective powers when applied to metals, such as iron or steel, against the corrosive action of sea water or other weathering agents, is very great and makes the pigment a very valuable commercial product.

What I claim is:

1. A paint containing white lead, finely divided mica, and a vehicle.

2. A paint containing a pigment, linseed oil, copal varnish, and finely divided mica.

3. A paint containing copal varnish, a pigment, and finely divided mica.

In testimony whereof, I have signed my name to this specification this 19th day of June, 1920.

CHARLES BERG.